Figure 1:
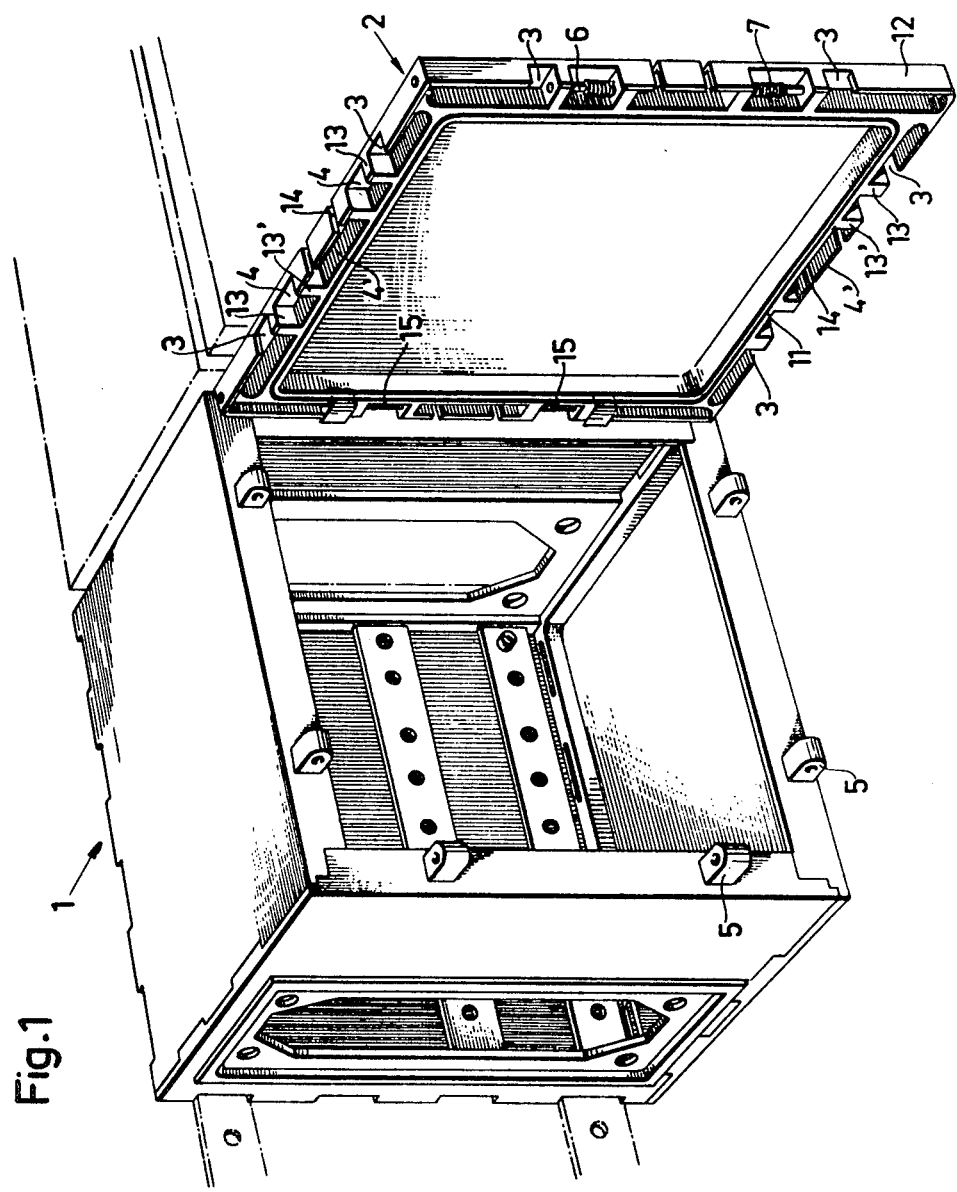

United States Patent

Algotsson

[15] 3,654,663

[45] Apr. 11, 1972

[54] DEVICE FOR CLOSURE OF BOXES, PREFERENTIALLY BOXES FOR ENCLOSURE OF ELECTRICAL EQUIPMENT

[72] Inventor: Sven Erik Algotsson, Gavle, Sweden

[73] Assignee: AB Elektroverken i Gavle, Akargatan, Gavle, Sweden

[22] Filed: Mar. 4, 1969

[21] Appl. No.: 804,229

[30] Foreign Application Priority Data

Mar. 6, 1968 Sweden.................................2953/68

[52] U.S. Cl..............................................................16/147
[51] Int. Cl................................................................E05d 15/50
[58] Field of Search....................16/176, 147, 144, 170, 171, 16/175, 173; 292/60; 49/193

[56] References Cited

UNITED STATES PATENTS 2,114,170  4/1938  Ball............................................16/176
3,311,945  4/1967  Kluge.........................................16/144
1,630,524  5/1927  Bruder.......................................16/176
2,662,242  9/1953  Hess..........................................16/176
2,791,681  5/1957  Dunker et al.............................16/176
2,778,053  1/1957  Hess et al..................................16/171
3,488,795  1/1970  Marguelisch.............................16/147
2,660,752  12/1953 Carcereny................................16/147

Primary Examiner—Bobby R. Gay
Assistant Examiner—Doris L. Troutman
Attorney—Sughrue, Rothwell, Mion, Zinn & Macpeak

[57] ABSTRACT

A box cover is provided in all its side edges with cut-outs, some of which correspond to lugs on the front of the box remote from its bottom in which lugs can be inserted pins sliding across the cut-outs corresponding to the lugs, so forming hinges and/or locking devices.

6 Claims, 4 Drawing Figures

PATENTED APR 11 1972  3,654,663
SHEET 2 OF 2
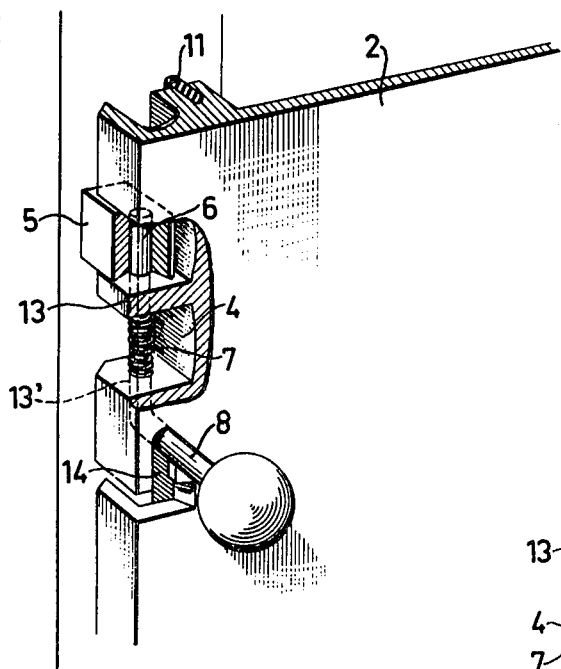
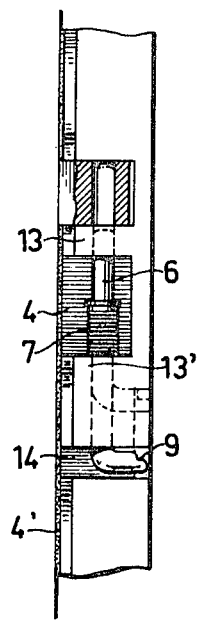
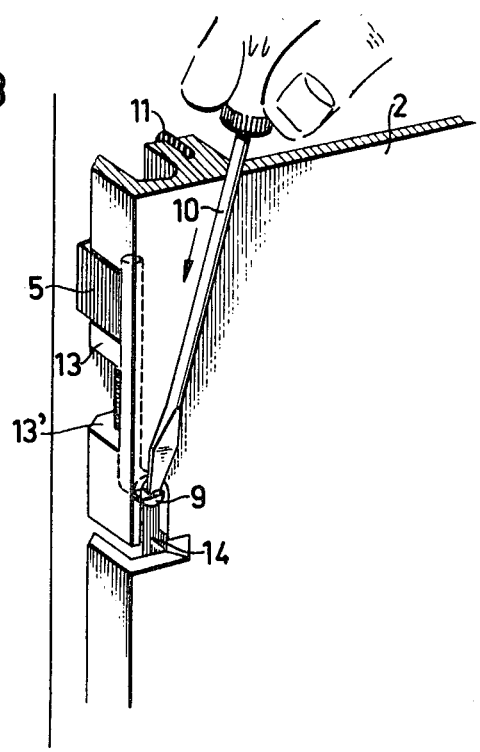

DEVICE FOR CLOSURE OF BOXES, PREFERENTIALLY BOXES FOR ENCLOSURE OF ELECTRICAL EQUIPMENT

The invention relates to a device for closure of boxes, preferentially boxes for enclosure of electrical equipment.

Bus-bars and electrical apparatus such as circuit-breakers fuses, measuring instruments etc. are often combined to form a distribution board where the various units are enclosed in boxes or the like for protection against touch, mechanical damage, mositure, gases, dirt etc. As the available space for such distribution boards is often strictly limited, a large number of electrical items must be located and enclosed within a fairly limited space. The enclosed items must be accessible for repair and maintenance, for which reason the boxes have detachable or openable covers. When the boxes are placed close together, difficulties arise in fitting the covers by means of hinges so as to open sufficiently wide to render the equipment in the boxes readily accessible. In some cases the difficulties have been so great that it has been preferred not to provide the cover with hinges but to make it entirely detachable. This means, however, that the opening of such boxes takes an unnecessarily long time.

Other problems found to be associated with the closure of said boxes relate to the planning of distribution boards in which the boxes are to be used. The rooms for such distribution boards contain not only ducts and runways for electrical cables but also ventilation ducts, water pipes, cupboards and shelving etc., with the result that, when installing boxes ordered in advance, it is found that certain boxes are not accessible in the manner planned. It is of extreme value, of course, if already installed boxes can be simply altered to suit the existing conditions. The choice for the suspension side of the cover, for example, may prove to have been unsuitable, and the placing of entries for electrical cables often implies, that the box cannot be turned so as, for example, to have a left-hand suspended cover right-hand suspended.

Still other problems associated with the closure of said boxes relate to regulations governing the enclosure of electrical equipment. Some equipment, for example, may be readily accessible while access to other equipment is allowed only through the use of tools. This means that a large number of types of boxes and covers must be manufactured and stocked, which involves heavy expenses.

The present invention is intended to eliminate the existing drawbacks of known apparatus and to solve the aforesaid problems associated with the closure of boxes for enclosure of electrical equipment. The device for this purpose is characterized chiefly in that it comprises a cover which, preferably in its side edges has cut-outs, of which some at least correspond to lugs on the front of the box remote from the bottom, in the which lugs, pins, bolts or the like are insertable, sliding across the cut-outs corresponding to the lugs, so forming hinges and/or locking devices with the possibility of free choice of side for suspension and lock, respectively.

The invention will now be described with reference to the attached drawings.

FIG. 1 shows a box for enclosure of electrical equipment with a closure device according to the invention, FIG. 2 a locking device for manual operation, FIG. 3 a locking device for operation with a tool, FIG. 4 a locking device in unlocked position.

FIG. 1 shows a box 1 for enclosure of electrical equipment having at its open front lugs 5 for suspension and locking of a closure device according to the invention, consisting of a cover 2. The cover 2 is surrounded by a frame 12 having cut-outs 3 corresponding to the lugs 5. In the frame 12 are also cut-outs 4 separated from cut-outs 3 by partitions 13, the cut-outs 4 being intended to enclose pins, bolts 6 or the like extending through the partitions 13 into the cut-outs 3. Other cut-outs 4' in the frame 12 are separated by partitions 13' from cut-outs 4. The cut-outs 4' are accessible via slots 14 from the front of the cover.

Cut-outs 3, 4, 4' and partitions 13, 13', as also lugs 5, are identically located along two opposite sides of cover 2 and the open front of the box.

The invention permits hinging of the cover 2 to the box 1 along any side. This is achieved through the fact that bolts 15 extending through holes in the partitions 13, 13' engage in lugs 5 situated along one side of the open front of the box 1.

Locking of the cover is done preferably on the side of the cover, opposite to the hinged side, but can of course be done on any other one or more sides.

The manner of locking of the cover 2 according to the invention is best seen from FIGS. 2–4. According to current regulations for closure of boxes for enclosure of electrical equipment certain closures shall be openable without a tool, others with a tool. According to the invention the cover is so formed that the locking devices can be selected according to existing requirements. FIG. 2 shows, for example, a locking device arranged for manual operation through the fact, that the end of the bolt 6 opposite to lugs 5 is prolonged so as to form a handle 8 extending through the slot 14. In order to ensure a reliable lock, there is in the cut-out 4 a spring 7 which keeps the bolt 6 in locked position. When the cover 2 is to be opened, the handle 8 is pushed along the slot 14 against the action of the spring 7. The bolt 6 is thereby pushed out of the lug 5. The locking device can thereafter, if desired, be secured in unlocked position against the action of spring 7 through the turning of the handle 8 from a position essentially perpendicular to the plane of the cover 2 to a position essentially parallel with the plane of the cover 2.

FIG. 3 shows a construction corresponding to that in FIG. 2, the locking device, however, being designed to be openable only with a tool 10. In this case the bolt 6 is not prolonged to form a handle but is terminated in the slot 14 by an engagement device suited to the tool 10.

FIG. 4 shows the locking device with the bolt 6 in unlocked position, spring 7 being fully compressed.

A complete seal between the box 1 and the cover 2 is obtained by means of a sealing strip 11, preferably of natural or synthetic sponge rubber, in the frame 12 of the cover 2.

The closure device according to the invention has here been described as a hinged cover, but the cover can, of course, also be arranged entirely detachable by arranging locking devices operated by a handle or tool on at least two opposing edges of the cover. The invention thus permits a large number of alternative combinations.

To ensure a reliable seal by means of a strip in a slot in the cover, projecting only slightly from the cover, the holes in the lugs are placed fairly close to the front strip of the box, the outer edges of the cover facing the front of the box being chamfered.

Although the invention has been described in relation to some of its embodiments, it can be varied within the scope of the subsequent claims.

What I claim is:

1. A cover for sealing the open end of a box comprising:
   a. a plurality of groups of lugs each lug having a hole therein on the ends of said box;
   b. a frame around said cover;
   c. first cutout means in said frame, said first cutout means corresponding to said plurality of groups of lugs and positioned to receive said plurality of groups of lugs;
   d. interconnecting means engaging the holes in said lug for holding a first of said groups of lugs within the corresponding cutout means whereby the first of said groups of lugs, the corresponding first cutout means, and said interconnecting means form hinges for holding said frame and cover to said box; and
   e. movable interconnecting means having a first position for engaging the holes in said lugs for holding a second group of said plurality of groups of lugs within the corresponding first cutout means and having a second position for permitting the removal of said second group of said plurality of groups of lugs from the corresponding first cutout means whereby said second of said groups of lugs, the corresponding first cutout means, and the movable interconnecting means form a lock mechanism for locking said frame and cover to said box.

2. The apparatus of claim 1 wherein said movable interconnecting means comprises a spring loaded bolt and a handle whereby said spring loaded bolt is moved from said first position to said second position by moving said handle.

3. The apparatus of claim 1 wherein said movable interconnecting means comprises a spring loaded bolt and engaging means for engaging a tool whereby said spring loaded bolt is moved from said first position to said second position by engaging a tool in said engaging means.

4. The apparatus of claim 1 wherein the length and width of said covers are less than the length and width of the open end of said box.

5. The apparatus of claim 1 wherein said frame includes a sealing strip positioned to bear against the edge of said box around said open end.

6. The apparatus of claim 1 wherein the outer edges of said frame are chamfered.

* * * * *